(12) United States Patent
Sherman

(10) Patent No.: US 7,436,965 B2
(45) Date of Patent: Oct. 14, 2008

(54) OPTICAL OUT-OF-BAND KEY DISTRIBUTION

(75) Inventor: Nathan C. Sherman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 10/369,375

(22) Filed: Feb. 19, 2003

(65) Prior Publication Data

US 2004/0161111 A1 Aug. 19, 2004

(51) Int. Cl.
*H04L 9/00* (2006.01)
(52) U.S. Cl. .................. 380/278; 380/277; 705/71; 713/171; 726/2
(58) Field of Classification Search .............. 380/33, 380/256
See application file for complete search history.

(56) References Cited

U.S. PATENT DOCUMENTS 5,933,812 A * 8/1999 Meyer et al. ................ 705/15
5,995,624 A * 11/1999 Fielder et al. ............... 713/169
6,069,957 A * 5/2000 Richards .................... 380/281
6,271,815 B1 * 8/2001 Yang et al. .................. 345/82
2002/0110245 A1 * 8/2002 Gruia ........................ 380/278
2004/0120528 A1 * 6/2004 Elliott et al. ............... 380/278
2004/0208526 A1 * 10/2004 Mibu .......................... 398/33

* cited by examiner

*Primary Examiner*—Kambiz Zand
*Assistant Examiner*—Roderick Tolentino
(74) *Attorney, Agent, or Firm*—Lee & Hayes, PLLC (57) ABSTRACT

One aspect of the disclosure relates to an out-of-band communication system and associated process. The out-of-band communication system includes an encrypted data path that is configured to convey encrypted data. The out-of-band communication system includes an optical out-of-band channel that is physically distinct from the encrypted data path. The encrypted data path extends between an optical transmitter and an optical receiver. The optical out-of-band channel is configured to transmit key information from the optical transmitter to the optical receiver.

19 Claims, 4 Drawing Sheets

OPTICAL OUT-OF-BAND KEY DISTRIBUTION

TECHNICAL FIELD

This disclosure relates to encryption, and more particularly to key distribution used for encryption.

BACKGROUND

Encryption such as used in current computer systems can be divided into asymmetric (or, "Public Key") encryption and symmetric encryption. Both symmetric and asymmetric encryption utilize keys. The keys may be characterized as long numeric strings. An encryption key is used by a transmitter of a message to encrypt the message with an encryption algorithm. The receiver uses a decryption key and a decryption algorithm to decrypt the message. In symmetric encryption, the encryption key and decryption key can be relatively easily derived from each other. In asymmetric encryption, the encryption and decryption keys cannot be derived easily from each other. In either encryption system (symmetric or asymmetric), the encryption and decryption algorithms may be the same or different algorithms.

One challenge with encryption is to securely transmit the necessary information that can be used to generate the needed cryptographic keys between the transmitter and the receiver. One embodiment of a system that uses an asymmetric encryption algorithm utilizes public key/private key pairs. An example of an encryption algorithm that utilizes public key/private key pairs is the RSA (Rivest, Shamir, and Adleman) algorithm. Public key systems may use certificate authorities that store certificates or other key information from which one key of the public key pair can be derived and/or authenticated. Such asymmetric algorithms require a considerable amount of processing capabilities to perform. Many computer peripheral devices do not have sufficient processing capabilities to effectively perform such asymmetric algorithms in a reasonable amount of time. Public key crypto systems are vulnerable to chosen plain-text attacks.

Computer environments use a variety of hardware components including a computer as well as such peripheral devices as a display, a mouse, a printer, a personal display assistant (PDA), or a keyboard. Though certain communication paths in a computer system may be trusted, this does not necessarily mean all communication paths within that computer system are trusted. As such, certain communication paths may need to be encrypted.

Both parties must agree on an encryption algorithm and the corresponding key(s) to establish an encrypted communication path. However, sending the keys or sending the information to derive the keys over the insecure channel may result in a hacker capturing the key information and thereby gaining access to subsequent encrypted traffic. An alternative to sending the key information over the communication path is to manufacture the keys into the devices. However, hackers are also adept at extracting such information from hardware.

One solution for such peripherals as certain wireless keyboards, for example, is asking the user to type a key character string that appears on the computer display. The key character string is used to generate the key within the peripheral device. The key character string may be, for example, 16 or more characters in length. The characters for these key character strings are typically random. Typing in such key character strings is often time consuming, confusing, and error prone. In addition, it is also possible that the key character string can be viewed by an unintended or undesired third party visually or by using a camera, listening to the keyboard, etc.

For all of these reasons mentioned above, there exists a need for an encryption system or technique that makes transfer of key information less susceptible to intrusion by unintended third parties or hackers.

SUMMARY

This disclosure relates to an out-of-band communication system and associated process. The out-of-band communication system includes an encrypted data path that is configured to convey encrypted data. The out-of-band communication system includes an optical out-of-band channel that is physically distinct from the encrypted data path. The optical out-of-band channel extends between an optical transmitter and an optical receiver. The optical out-of-band channel is configured to transmit key information from the optical transmitter to the optical receiver.

BRIEF DESCRIPTION OF THE DRAWINGS

Throughout the drawings, the same numbers reference like features and components.

FIG. 3 illustrates one embodiment of an out-of-band communication system including an optical transmitter and an optical receiver, and an optical link formed there between;

DETAILED DESCRIPTION

One aspect of this disclosure involves the distribution of key information from an optical transmitter to an optical receiver over an optical out-of-band channel in a manner that enables subsequent secure communications over an encrypted data path. The device selected to generate the key information often includes an operating system since any device with a sophisticated operating system typically can compute a pseudo-random symmetric key quickly and reliably. The optical transmitter of that system then transmits the key information to the optical receiver. In many embodiments, the optical receiver is configured as being located within a peripheral device such as a keyboard, a printer, a display, a personal display assistant (PDA), or a mouse. After the key information is received over the optical out-of-band channel by the optical receiver, the key information is used to generate a key (or one key of a key pair). The suitable keys can then be stored by both parties and be used to encrypt and/or decrypt data that is being transmitted there between. Within this disclosure, the term "key information" or "key data" describes any information (including the key itself) that can be used to derive the key. Within the scope of the present disclosure, either end of the optical out-of-band channel can initially generate or receive the key information, and then transmit the key information over the opposed side of the optical out-of-band channel to generate the key.

Figure 6:
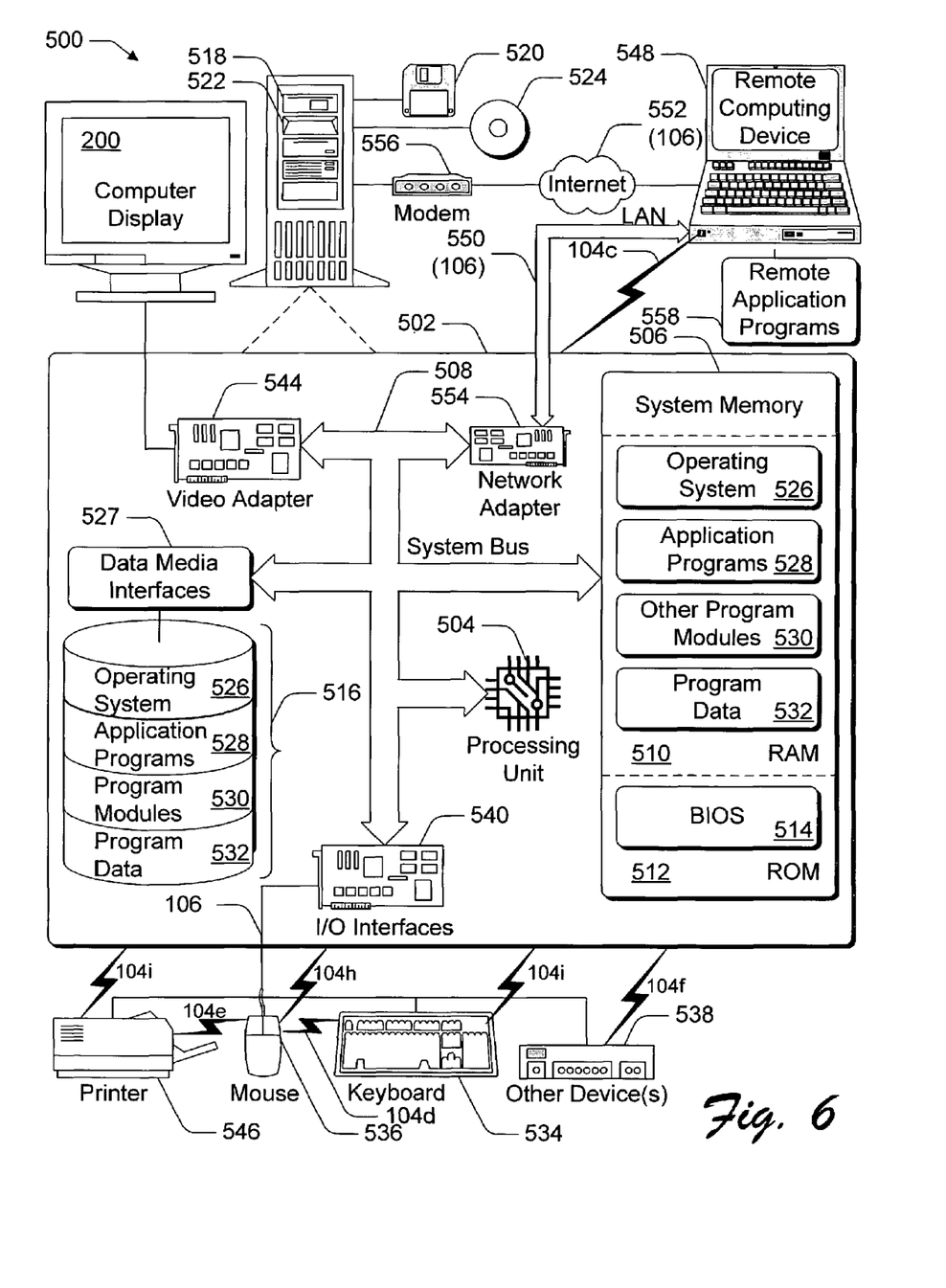
FIG. 6 illustrates a computer environment that includes the out-of-band communication system.

Some computer hardware and software systems can establish secure partnerships between software and the peripheral devices. The techniques disclosed herein provide an inexpensive, simple, and reliable alternative that is difficult for unintended third parties to intercept. One aspect of the present disclosure is an out-of band communication system for establishing encrypted communications between the operating system (OS) and peripheral devices within a computer environment 500 as illustrated in FIG. 6. In FIG. 6, exemplary out-of-band communication paths are illustrated as 104a, 104b, 104c, 104d, 104e, 104f, 104g, and 104h. The out-of-band communication system provides a technique for distributing key information to different peripheral devices and computers within the computer environment that can be used to encrypt data.

Figure 1:
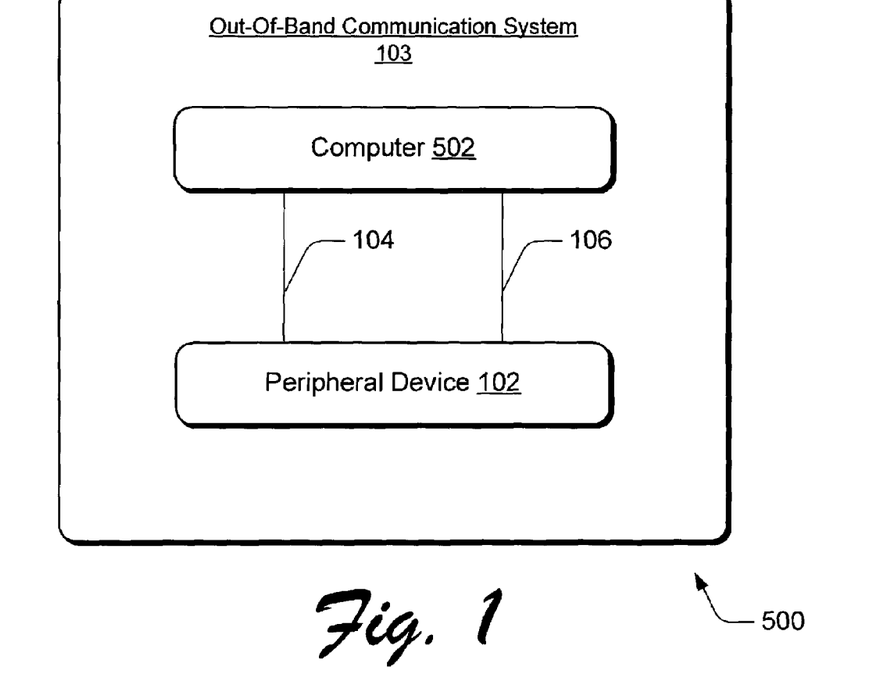
FIG. 1 illustrates a computer environment including one embodiment of an out-of-band communication system.

One embodiment of this disclosure provides an optical out-of-band channel 104 that is capable of carrying key information. The optical out-of-band channel 104 differs from the encrypted data path normally used to transmit the encrypted data. For example, FIG. 1 shows a block diagram of one embodiment of computer environment 500 that includes the computer 502, the peripheral device 102, and the out-of-band communication system 103. The out-of-band communication system 103 includes the optical out-of-band channel 104 and an encrypted data path 106.

In this disclosure, one embodiment of the computer 502 is directed at the portion of a computer environment 500 that includes a central processing unit (CPU), the primary operating system, and the memory. Such peripheral devices 102 as a mouse, a keyboard, a computer display, a PDA, and the like are electronically coupled or coupled by a wire-based or wireless connection to the computer 502 to provide a user interface with, and data transfer with, the computer. The encrypted data path 106 can transmit either encrypted data or non-encrypted data. Different embodiments of the encrypted data path 106 can include a wired-based connection, a wireless connection, an infrared link, or any other such connection such as normally exists between computers and their respective peripheral devices to transfer data there between.

The term "out-of-band" indicates that the optical out-of-band channel 104 is physically distinct from the encrypted data path 106. Out-of-band, in its broadest term, indicates that a distinct communication path is used that differs from a communication path over which the bulk data is transmitted. The actual term out-of-band originated in wired-based telephone technologies. Out-of-band signaling can transmit and receive such information as encryption key information. One embodiment of this disclosure is particularly directed at symmetric encryption since symmetric encryption required transfer of identical keys between computers. Symmetric encryption often is fast since symmetric keys often only include 128 bits of data, which is relatively small. The out-of-band channel is envisioned to be optical, although in certain embodiments other media can be used to transmit the key information.

Modern cryptography involves keys, and both parties typically have to agree on the format of the keys and key information. The out-of-band communication system 103 concepts can utilize any cryptographic algorithm that uses a key. Usually, the keys have a prescribed time limit (seconds, days, or even months depending on the application), which limits certain attacks when keys and key information are re-used. Alternatively, the keys may have no time limit. To establish and maintain secure communications, two parties must each possess a key, which is secret from others, that is required for encryption.

For encrypted communication, both parties need the appropriate keys. There are secure key-exchange algorithms where both parties have keys, are communicating, and an eavesdropping third party cannot get the key. These secure key algorithms are often complex and require considerable bandwidth and/or secure communication with trusted third parties. With a short key that is susceptible to brute force attacks, there should be a short time limit on the key. Often there are short (temporary) keys that are used to obtain longer keys, the longer keys can be used for a longer period of time.

It is important to provide a secure optical out-of-band channel 104 that provides a level of security based on the application. In certain embodiments, it is also important that the optical out-of-band channel 104 be simple and/or inexpensive. This disclosure proposes that the party best able to generate the pseudo-random numbers that is used to derive the key information be the party that also generates the key information that is transmitted to the other party. Typically, the computer 502 including the operating system is the party that is best able to generate the pseudo-random numbers. In many embodiments, the peripheral device 102 includes the optical receiver that is in communication with one end of the optical out-of-band channel 104. The key derived from the key information can be used establish secure communications between the parties following its transfer.

Reducing the complexity of the cryptographic algorithms associated with certain peripheral devices 102 such as keyboards, printers, PDAs, displays, and computer mice is desired. Certain peripheral devices 102, for example, include relatively inexpensive controllers that is designed for the usual peripheral device operation. Due to the competitive pricing and nature of the peripheral devices, making the controllers of the peripheral devices more complex and expensive to be able to handle many types of encryption is undesired due to the associated added expense of the more complex controller. In addition, certain secure cryptography algorithms are too computationally complex for simple computer devices such as might be included in certain peripheral devices 102.

With asymmetric encryption, each party possesses one key from a pair of keys. The key pair includes a public key and a private key. It is extremely difficult and time consuming to decrypt messages encrypted with the public key without using the private key, and vice versa. Asymmetric encryption (also known as public key encryption) is named for the different keys used to encrypt and decrypt. Those parties wishing to communicate using asymmetric encryption exchange public keys that can then be used to encrypt messages to each other. Each recipient then uses their secret, private key to decrypt messages sent to them. One embodiment of public key encryption relies on the RSA (Rivest, Shamir, and Adleman) algorithm.

With symmetric encryption, both parties possess common information to generate keys for both encryption and decryption of a message. In general, one party generates a key and delivers it to the other party in a secure manner. Third parties (or devices) can also distribute keys in a secure manner. Certain symmetric algorithm embodiments include DES (Data Encryption Standard), Triple DES, AES (Advanced Encryption Standard), RC4, etc. Symmetric encryption will likely be used in the disclosed embodiment of out-of-band communication system 103 because it uses keys that are considerable smaller than asymmetric encryption. Symmetric encryption commonly uses 128 bit keys that is considerably smaller than the keys used for asymmetric encryption.

There are challenges associated with using asymmetric encryption in certain embodiment of out-of-band communication system 103. The cost of asymmetric encryption is high. Asymmetric algorithms are computationally intensive since they use large keys. As such, asymmetric encryption requires considerable program space (ROM), working memory (RAM), and time. With asymmetric encryption, there is no guarantee that a received public key actually came from the intended party. In a "man-in-the-middle" attack, an adversary could pose as the other party to each of the original parties and capture or insert false data.

To combat these problems with asymmetric encryption, trusted third parties are used to "certify" that a particular public key belongs to a particular party. For example, a manufacturer of peripheral device 102 could have a trusted third party certify its key. The manufacturer then places the key and its certificate in memory in the peripheral device 102 for delivery to the operating system (OS) of the computer. In the event that adversaries discover a key in the memory, and therefore gain the ability to pose as the "man-in-the-middle," the certificates can be marked as "revoked" by the certificate issuer. However, the parties receiving the certificates must be able to contact the certificate issuer to determine if a certificate is revoked. Unfortunately, a user cannot assume they are connected to a certificate issuer(s).

Another weakness of asymmetric encryption occurs if the message encrypted is predictable or taken from a small set of possible messages. Since an attacker has access to the public key used to encrypt the message, the attacker can use the key to encrypt all possible messages and then simply match the intercepted message with this set of messages to determine the unencrypted message.

Other ways to distribute key information are used to derive symmetric keys via various non-encrypting key exchange algorithms. However, those algorithms also usually fall to a "man-in-the-middle" attack, require random number generation (which is difficult in some hardware), and/or are computationally difficult. For these reasons, asymmetric encryption and other key exchange algorithms may not be desirable for key distribution in relatively inexpensive peripheral devices.

Therefore, the out-of-band communication system 103 established between the computer 502 and the peripheral device 102 provides a secure means of distributing key information. The out-of-band communication system 103 uses an additional, optical out-of-band channel 104 to distribute the key information. "Out-of-band" distribution indicates the key information is distributed on the optical out-of-band channel 104 (or "band") that does not carry the encrypted traffic as does the encrypted data path 106. Instead, the optical out-of-band channel 104 carries the key information such as the key itself.

With some current approaches, a user types in key data on a keyboard based, for example, on characters that are being displayed over a secured computer display. In this manner, the encrypted data path 106 is not used to transmit at least a portion of the key information. However, not all peripheral devices have a keyboard or other viable user input device, and not all PCs have a suitable display that is secure from eavesdroppers. Also, this method is subject to user error, and can be somewhat confusing to the user.

Wire-based peripheral devices 102 include keyboards, printers, displays, PDAs, mice, other cursor control devices, and so forth. These types of peripheral devices can also be configured using wireless links. Examples of wireless protocols include the IEEE 802.11 wireless networking protocol and Bluetooth. It is often difficult and/or expensive to establish the wired connections or wireless links to the peripheral devices as secure connections. For example, when a user is using a wireless keyboard, wireless mouse, wireless printers, wireless PDA, or other wireless peripheral devices 102, it is sending the key information across the wireless link. The user does not want anyone with a radio receiver to be able to intercept and read the bulk data. To limit such reading of the bulk data, the bulk data has to be encrypted using the key. The problem is that the encryption requires the key to do the encryption, and both sides of the communication have to have the associated key (or key of a key pair). As such, different embodiments of out-of-band communication systems can use wireless-peripheral devices as well as wire-based peripheral devices.

When there is an out-of-band communication system 103 that has an encrypted data path 106 that is not secured already, key information or data cannot be transmitted over the encrypted data channel using less expensive algorithms than, for example, key exchange algorithms. In such key exchange algorithms, both parties often have to go to a trusted third party (e.g., certificate authority or another device) to obtain key information or data in a secure fashion.

The out-of-band communication system 103 provides a technique to get the key information into the optical receiver device while reducing the possibility that a third party can eavesdrop into the key exchange. The out-of-band communication system 103 thus represents a solution to the classic problem of key exchange of key information within cryptography.

Current secure communication systems are configured to improve the security of the exchange of key information to distribute or receive the key information. In such systems, a user generates key information (such as the key itself) that is handed off in a secure manner to another entity. This is the most efficient and secure technique to distribute keys. For extremely sensitive information, human couriers distribute such key information as diplomatic codes using this technique. The key information is distributed to a secure courier, and then the key information is escorted by the courier over a secure path to the third party. The third party then uses the key information for encryption. It is important that the path be secure for the key distribution system to be effective. Unfortunately, the use of couriers is expensive, and the user has to trust the particular courier.

One aspect of the present disclosure is to mimic this key distribution process by using the peripheral device 102 to transmit and/or receive the key information. A basic premise is that with a wireless device, the path between the computer device and the peripheral device 102 is not secure. This explains why data transmitted over the path is encrypted in the first place. As such, it is important to derive a secure, inexpensive manner to transmit key information such as keys and other such security data between the computer and the peripheral device 102.

Once the peripheral device 102 obtains the key information, the key is derived and used by the peripheral device to encrypt a message that is transmitted to the computer. The message indicates to the computer that a secure optical out-of-band channel 104 has been established between the computer 502 and the peripheral device 102.

Figure 2:
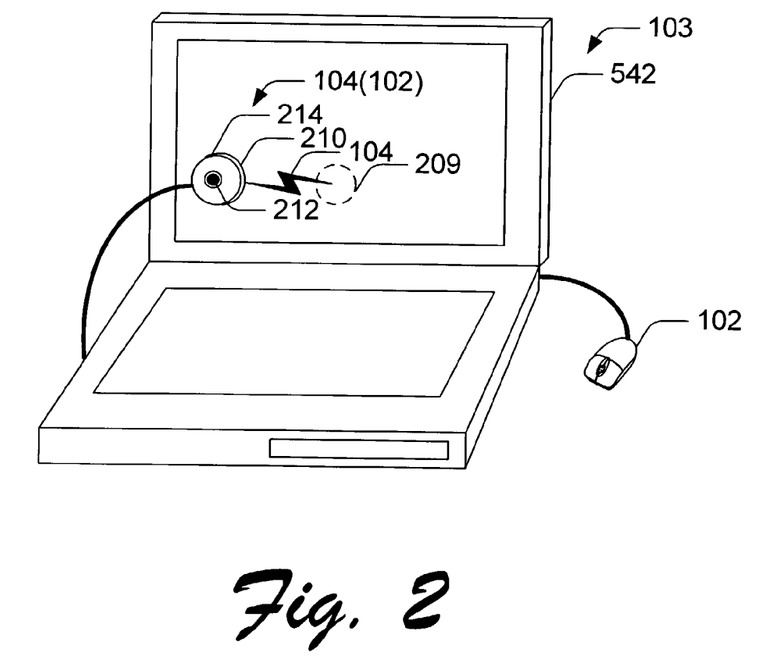
FIG. 2 illustrates one embodiment of an out-of-band communication system.

FIG. 2 shows one embodiment of the optical out-of-band channel 104 (included in the out-of-band communication system 103) established between the computer 502 and the peripheral device 102. The computer 502 includes a transmitter portion formed as a portion of the computer display or monitor 542 that displays images based on key information generated from other portions of the computer 502. The computer display or monitor 542 can display key information on the computer display or monitor 542 over a relatively small footprint 209.

The optical out-of-band channel 104 includes the footprint 209 of the computer display or monitor 542, a close-coupling device 210, and a connection 211 between the two devices that permit the transfer of data there between. The close-coupling device 210 includes an optical detector 212. In certain embodiments, the close-coupling device is not included and, for example, the optical detector can be hand-held and positioned relative to another optical transmitter to receive the key information. This may particularly be the case with relatively inexpensive optical out-of-band channels 104 and/or those instances where the security of the optical out-of-band channel 104 is not very significant. For example, certain personal computers (PCs) may be provided with an optical out-of-band channel 104 for general users. Such users may find it important to use the optical out-of-band channel 104 with or without the close-coupling device 210 depending on the particular application.

The close-coupling device 210 is illustrated in FIG. 2 as being physically separated from the footprint 209 on the computer display, which represents one embodiment. This separation between the close-coupling device 210 and the footprint 209 illustrates the important components of the out-of-band communication system 103. In another embodiment, the close-coupling device 210 is designed to closely fit over the footprint 209 in a manner that obscures any data that is transmitted over the optical out-of-band channel 104 from third parties. The better that the close-coupling device 210 can obscure or obstruct the light passing through the optical out-of-band channel 104, the more secure is this embodiment of optical out-of-band system 103. It is envisioned that such mechanisms as locks, positional sensors, optical seals, conflicting light sources may be applied to ensure that the close-coupling device is sufficiently close to the footprint 209 to reduce (in certain cases to negligible levels) the light that is traveling across the out-of-band channel from escaping into the neighboring environment. The light that escapes into the neighboring environment can potentially be detected by a third party. The more important it is to maintain the key information secret, the more elaborate and expensive can be the safeguards against eavesdropping by unintended third parties.

The optical detector 212 typically includes optical pattern recognition (OCR) software, and can recognize the optical pattern relating to the transmitted key information on a portion of the computer display or monitor 542 (i.e., within the footprint 209). During operation, the user is prompted to position the close-coupling device 210 in a position such that the optical detector 212 is directed to detect key information being displayed over the footprint 209 of the computer display 542. Once the optical detector 212 is located over the footprint of the computer display 542, then the key information can be displayed optically over the footprint of the computer display 542 that is obscured by the mounting portion. In one embodiment, a carrier pattern will be transmitted from the computer display to the close-coupling device 210. When the close-coupling device detects the carrier signal, it can send a message over the bulk data path indicating that it is ready to receive the key information. In other embodiments, the indication that the close-coupling device is positioned over the footprint 209 of the display is provided either by the user (e.g., the user presses a button when the close-coupling device is located over the footprint), or a proximity sensor that determines when the close-coupling device is sufficiently close to the footprint to adequately obstruct the light transmitted within the footprint.

The embodiments of the optical out-of-band channel 104 fashioned as optical links to transmit key information have several benefits as described herein such as being relatively inexpensive. In addition, optical links do not pass through walls and can be obscured or hidden by the close-coupling device. Due to the reduction of light transmitted outside of the close-coupling device, it is difficult to attack or decrypt without the user's knowledge. The configuration, shape, or material of the close-coupling device 210 can also reduce the possibility of such attacking or decrypting the key information. Another way of reducing the possibility of interception is to transmit the optical data at a frequency that would be difficult for a typical video camera to record.

The mounting portions of the close-coupling device reduce the light associated with the key information that is generated by the close-coupling device 210. This reduction results by limiting the light escaping from between the computer display 542 and the mounting portions of the close-coupling device. In other words, the mounting portions can be designed to reduce the light leakage from the optical out-of-band channel 104, and thereby control who has access to the transmitted key information. Any such light that would escape between the footprint 209 and the mounting portions should be limited to some level unusable to eavesdroppers to detect key information. The optical detector 212 then detects the key information generated by the computer display 542.

The close-coupling device 210 reduces the possibility of detection of data being transmitted over the optical out-of-band channel 104. As such, any configuration of close-coupling device that can reduce the light associated with the key information escaping from its travel across the out-of-band channel is desired. For example, the mounting portions of the close-coupling device 210 can include rubber or other deformable material to provide an enhanced seal between the optical transmitter and the optical receiver. The concept to use optical data streams to transmit the key information over the out-of band communication system 103 is efficient, inexpensive, and is relatively simple to protect providing different levels of security.

The embodiment of out-of-band communication system 103 described relative to FIG. 2 is configured so a portion (footprint) of the computer display (e.g., monitor) acts as an optical transmitter that transmits key information to the optical receiver located in the close-coupling device 210. By using the monitor as the optical transmitter, data transfer rates of each pixel is limited based on the refresh rate of the monitor (typically between 60 Hz and 100 Hz). This is the maximum transfer rate of key information occurs only if a single pixel and a monochromatic color are used for the key exchange. There are a variety of techniques that increase the transfer rate of key information that can be displayed on a computer display.

If more pixels are used, this will increase as multiples of the refresh rate. For example, a block of 64 by 64 pixels can be used to exchange the key information, wherein 4096 values of key information can be transmitted during each computer display refresh. Alternatively, a plurality of lines can be displayed on the screen to exchange key information. Additionally, the pixel can be one of a wide variety of colors, with each color representing a different value that can exchange key information. As such a large variety of techniques can be used to transfer a considerable amount of key information over the computer display or monitor to the optical receiver. Consider that the out-of-band communication system 103 is not being used for bulk data transfer, it is only being used to transmit a small amount of data that is associated with the key information to the optical receiver.

Figure 3:
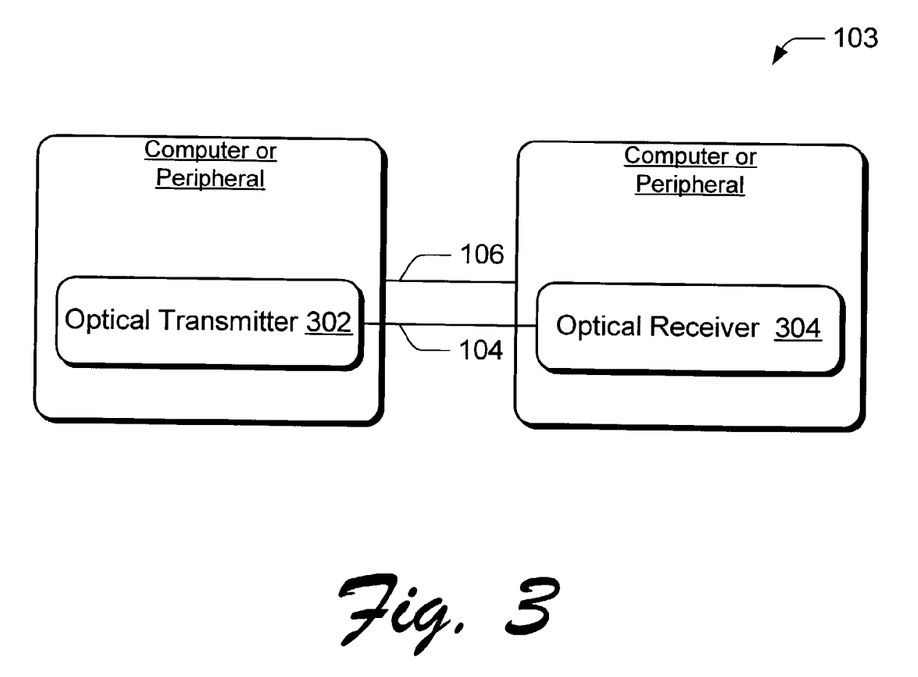

A block diagram of one embodiment of the optical out-of-band channel 104 is illustrated in FIG. 3 as including a generalized optical transmitter 302/optical receiver 304 configuration. As such, the transmitter 302 includes a light source 303 that securely transmits the key information to the optical receiver 304 using the optical out-of-band channel 104 that differs from the encrypted data path 106. This disclosure thereby describes multiple embodiments of the optical out-of-band channel 104 that are arranged to transmit the key information between the optical transmitter 302 and the optical receiver 304.

Once key information is sent to a peripheral, the key may be stored in non-volatile memory to avoid having to repeat the key exchange process after a shutdown. The duration of storage in non-volatile RAM may be permanent or may have an expiration/renewal period for added security. In this disclosure, the terms "key information" and "keys" includes key pairs in private key encryption schemes. Key information is used to generate, or includes, key pairs. The key pairs are stored in the computer 500 and can be used to encrypt the data between the computer and the peripheral device.

The optical transmitter can include different embodiments of the optical source 303 located within the optical transmitter 302 that include, but are not limited to, the primary PC display, a keyboard LED, an IrDA port or other visible or non-visible light source. In general such computers 500 as shown in FIG. 6 (such as a PC or laptop) currently include such integrated or peripheral devices built into the system that include light sources that could be used as optical transmitters. The light from these light sources can be modulated in a manner that can be used to transmit the key information in a manner that could incur zero (or at least very little) additional hardware cost. Examples of light sources on typical computers that can function as an optical transmitter include the keyboard light emitting diode (LED) displays or cathode ray tube displays that are used as computer displays, the battery indicator, the power indicator, the disk usage indicator, and a variety of other such indicators.

The optical receiver 304 can be any optical sensor or transducer capable of converting light into an electrically readable signal, such as a phototransistor, a charge-coupled device (CCD), or a similar device. Such an optical transducer could be integrated into the body of the computer or alternatively added to some peripheral devices 102. Some peripheral devices already have the capability to act as an optical receiver, such as computer cameras and optical mice that include digital cameras (such as the Microsoft® IntelliMouse® Optical. Alternatively, an entirely new optical transducer could be added to the computer or the peripheral device that would act as the optical receiver as described in this disclosure. Adding a simple phototransistor and a few biasing resistors would incur a cost of only a few cents to many embodiments of the computer or the peripheral device.

Providing the optical out-of-band channel 104 between the optical transmitter 302 and the optical receiver 304 has several advantages. An out-of-band communication system 103 using the optical out-of-band channel 104 is not as susceptible to mistyping or omissions as manual entry systems. No physical data entry is required by the user, and data rates that can be transmitted over the optical out-of-band channel 104 can be much higher than manual entry. There is no data entry hardware required for the optical out-of-band channel 104. The data protocol is not specified in different embodiments of the optical out-of-band channel 104 in the out-of-band communication system 103. Devices that can be used as the light source 303 within the optical transmitter 302 portion of the optical out-of-band channel 104 are usually already supplied as a part of a computer 500, so there is little -or no cost added to the purchaser of the computer. The reconfiguration of the optical receiver 304 to operate as a portion of the optical out-of-band channel 104 to receive key information within the out-of-band communication system 103 is relatively inexpensive, usually only adding a few cents cost if any to an existing peripheral device 102.

Key information can be transported via any protocol agreed upon by or otherwise known to both parties. In another embodiment of optical out-of-band system 103, for example, a display/camera combo could flash a single image that would be digitized to form key information. Alternatively, both devices could use cameras to digitize an image produced by the user to contain similar key information. Many embodiments of the optical out-of-band channel 104 are possible that are designed for a specific application.

Key information is transmitted in line-of-sight by many embodiments of the optical out-of-band channel 104, such line of sight transmission makes sniffing of the key information by a third party more difficult. For example, if the primary display of a PC is not secure from eavesdropping, another light source such as the invisible light of an IrDA port could be used as the optical transmitter to transfer the key. Again, many embodiments of out-of-band communication systems 103 are possible.

Figure 5:
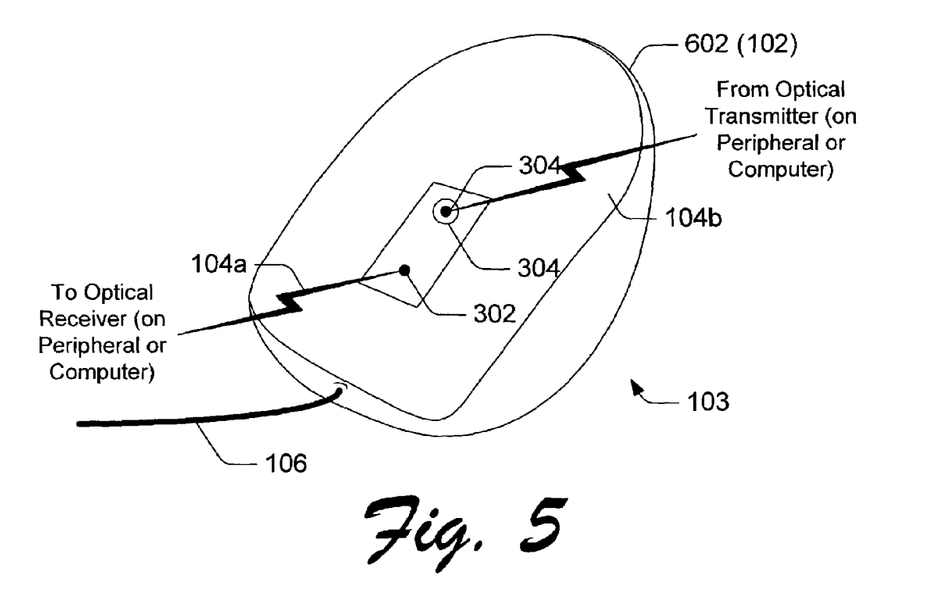
FIG. 5 illustrates another embodiment of the out-of-band communication system in which the optical out-of-band channel extends between a computer and the peripheral device such as an optical mouse.

Any device that has both an optical transmitter and an optical receiver can be used to transfer key information to other devices. For example, an optical mouse as illustrated in FIG. 5 has both a camera and an LED. A user could transfer key information from the monitor to the mouse and then use the mouse to transfer that key information to another device, such as a printer. This would allow transfer of key information to devices that may be physically distant or inconvenient to bring into an optically feasible proximity.

Figure 4A:
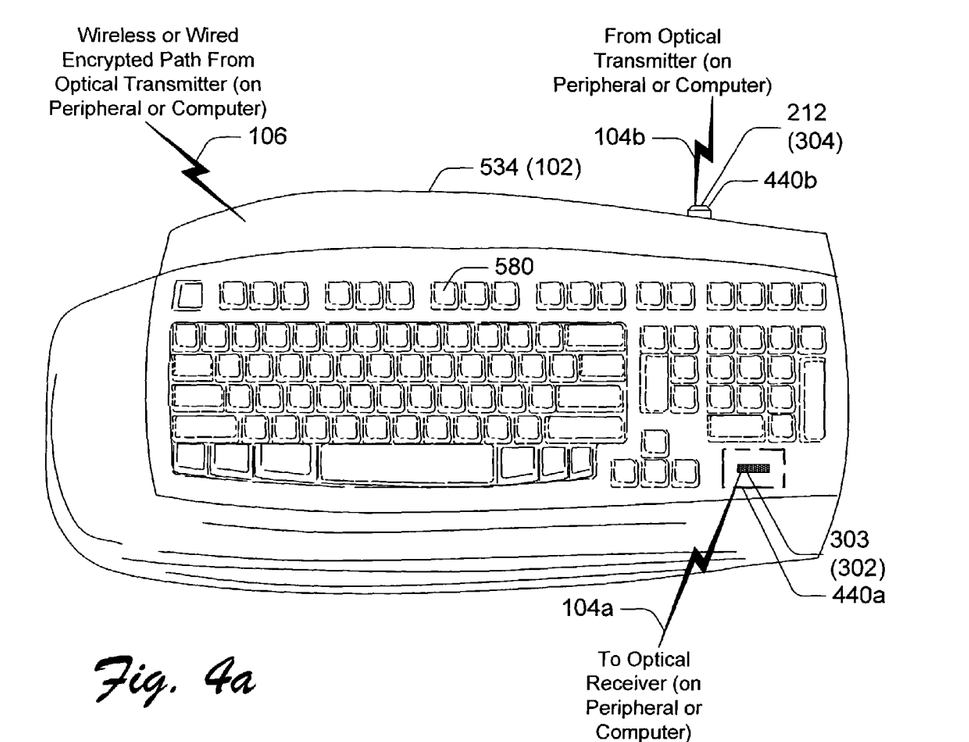
FIG. 4a illustrates a top view of one embodiment of peripheral device portion of the out-of-band communication system, the peripheral device is configured as a wireless keyboard.
Figure 4B:
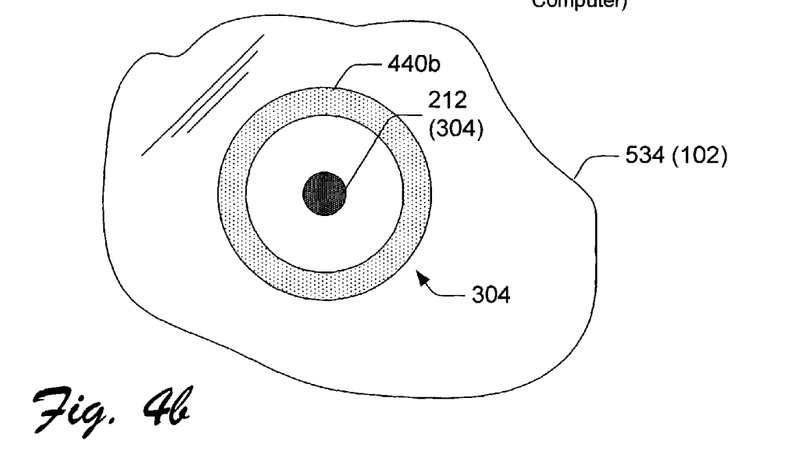
FIG. 4b illustrates a side view of the peripheral device illustrated in FIG. 4a illustrating an optical receiver as viewed through sectional lines 4b-4b.

FIGS. 4a and 4b show another embodiment of out-of-band communication system 103 in which a plurality of optical out-of-band channel (104a and 104b) can be provided relative to such a peripheral device 102 as a wireless keyboard 534 (a portion of the keyboard 534 is shown in the figure). One optical out-of-band channel 104a extends from the optical transmitter 302 to an optical receiver that is coupled to another computer or peripheral device. Another optical out-of-band channel 104b extends from another optical transmitter and can transmit key information to the optical receiver 304. The optical transmitter 302 and/or the optical receiver 304 that are included in the optical out-of-band device 103 (i.e., on the keyboard 534) are positioned at a location that does not interfere with the user depressing various ones of the typing keys 580 during the normal operation of the keyboard 534.

In the embodiment of optical out-of-band system 103 is describe relative to FIGS. 4a and 4b, the operation of the optical receiver 304 is described in addition to the operation of the optical transmitter 302. Various components of the optical out-of-band system 103 are implemented on a computer keyboard. The peripheral device as shown in FIGS. 4a and 4b includes an integrated optical transmitter 302 and an optical receiver 304 that are configured to form respective optical out-of-band channels 104 with respective other optical receivers and optical transmitters (not shown) that are located in another computer or peripheral device.

The optical receiver 304 can be a phototransistor or other photosensor mounted, for example, within the material forming the keyboard. The mounting portion 440b is shown as being provided in the keyboard in such a manner that during key exchange, the mounting portion 440*b* of a portion of the keyboard is positioned over, and optically obstructs, light containing the key information that is transmitted from the optical transmitter 302 to locations other than the optical receiver. This permits key information transfer from the distinct optical transmitter to the optical receiver 304 integrated on the keyboard. The mounting portion 440*b* is configured to reduce the light that is associated with the key information emitted by the optical transmitter 302, the light could otherwise possibly be detected by eavesdroppers. In more sophisticated systems that are intended to provide a more secure optical out-of-band channel 104, the mounting portion 440*b* is configured to provide more resistance against light escaping from the optical transmitter escaping into the local environment.

The light source 303 of the optical transmitter 302 includes, for example, one of the lights located on the keyboard that is associated with the operation of the computer. These light sources 303 may include the power indicator light or a portion of the computer display can be programmed to transmit the optical stream containing the key information over an optical out-of-band channel 104. A light containing portion 440*a* is integrated within the keyboard about the optical transmitter 302 to reduce light traveling through the optical out-of-band channel into the local area, and thereby reduce the possibility of detection of the key information. As with the other embodiments of out-of-band communication system 103, the particular configuration, size, or material of the light containing portion is illustrative in nature, and is not intended to be limiting in scope. Any configuration of light containing portion that can obstruct, diminish, deflect, or otherwise reduce the amount of light is within the intended scope of the light containing portion of the out-of-band communication system 103.

The optical receiver 304 is configured to receive key information from other optical transmitters (not illustrated) over another optical out-of-band channel 104*b*. A light containing portion 440*b* is formed on the keyboard about the optical receiver 304 to limit light traveling through the optical out-of-band channel into the local area, and thereby reduce the possibility of detection of the key information.

Another light containing portion 440*a* is located about the optical transmitter 302 located within the peripheral device to reduce light associated with the key information escaping into the local environment as during the key exchange. The use of the light containing portions within this disclosure is optional. Either the optical transmitter 302 or the optical receiver can be used with or without their respective light containing portion while remaining within the intended scope of the present disclosure.

As such, the optical transmitter 302 is selected to be optically coupled to the computer 502 while, at perhaps a later time, the optical receiver 304 is optically coupled over the out-of-band channel 104*b* to the peripheral device 102. Alternatively, to allow another optical out-of-band channel 104*a* to be created, the optical transmitter 304 is formed on the keyboard. As long as the optical transmitter 302 is sufficiently trusted, based on the particular application, a secure optical out-of-band channel 104 between the optical transmitter 302 and the optical receiver 304 will provide a secure connection to transmit the key information from the computer 502 to the peripheral device 102.

The different embodiments of optical transmitter 302 described within this disclosure are illustrative in nature, and not limiting in scope. There are large variety of visible, infrared, ultraviolet, and other light sources that can be configured to act as an optical transmitter to transmit the key information that are within the intended scope of the present disclosure. Many out-of-band communication systems 103 located in a peripheral device 102, such as illustrated in FIGS. 4*a*, 4*b*, and 5, include both the optical transmitter 302 and the optical receiver 304 that may both transmit and receive key information along distinct out-of-band channels. The optical transmitter 302 and optical receiver 304 within the peripheral device can be associated with their respective optical out-of-band channel 104. Such peripheral devices 102 can use the optical receiver 304 to form a first optical out-of-band channel 104 to receive key information from another peripheral device or computer. Additionally, such peripheral devices 102 can use the optical transmitter 302 to transmit key information to another peripheral device or computer over a second optical out-of-band channel.

Any peripheral device 102 that includes both the optical transmitter and the optical receiver can both transmit and receive key information over distinct secure optical out-of-band channel 104 to and from distinct computers 502 or other peripheral devices 102. Such peripheral devices as optical mice and wireless keyboards are by their nature portable, and can be positioned to create optical out-of-band channels with a plurality of desired peripheral devices or computers (such as may be necessary if the single peripheral device includes both optical transmitter and optical receiver portions). It is also within the scope of the disclosure that the peripheral device includes only an optical transmitter 302 or an optical receiver 304.

Once a particular peripheral device 102 is secured using the optical out-of-band channel, then that peripheral device can be used to secure another peripheral device using another optical out-of-band channel 104. For example, FIG. 5 shows another embodiment of out-of-band communication system 103 which includes one or more optical out-of-band channels 104*a* and 104*b* that extend between a computer or a peripheral device (not shown) and an optical mouse 602 (illustrated in a bottom perspective view). The optical mouse 602 includes the optical transmitter 302 and the optical receiver 304 to form respective optical out-of-band channels 104*a*, 104*b*.

The use of optical transmitters 302 and optical receivers 304 in the optical mouse may represent a slight modification of current optical mouse designs. In this embodiment of peripheral device, the optical transmitter 302 includes the light source 303 of the desired light bandwidth that is detectable by an optical receiver that is located on another peripheral device or computer to form a first optical out-of-band channel 104. The optical receiver 304 can detect the light from another peripheral device or computer to form a second out-of-band channel.

The optical receiver 304 can include a photo-sensor, such as a phototransistor, that can operate as, and be considered as, a camera that can detect images and/or motion. In fact, many current optical mice, such as the Microsoft® IntelliMouse® Optical, include such a camera used during its operation to detect motion.

Since the optical mouse includes both the optical transmitter and the optical receiver, the optical mouse (as well as other peripheral devices that include both the optical transmitter and the optical receiver) can receive the key information (using the optical receiver) over a secure optical out-of-band channel 104 from another computer 502 or other peripheral device 102. Alternatively, any peripheral device that includes both the optical transmitter and the optical receiver can transmit the key information over the optical out-of-band channel to another peripheral device. As such, a peripheral devices 102 having both the optical transmitter 302 and optical receiver 304 can be used to respectively receive and transmit key information from/to another computer or peripheral device. Such peripheral devices 102 can therefore act as a key conduit to transmit the key information between pairs of peripheral devices and/or computers.

As such, highly portable peripheral devices such as optical mice are highly useful to convey a key obtained from one computer or other peripheral device (using one optical out-of-band channel) to another desired peripheral device or computer (using another optical out-of-band channel). This process can be repeated between different peripheral devices or portions of the computer until, practically, all of the peripheral devices within the computer environment as shown in FIG. 6 have access to key information. Using this technique, such conveying peripheral devices can transmit the key information to each desired computer component or peripheral device within a computer environment using a variety of optical out-of-band channels 104 between the different computers and peripheral devices. The peripheral devices can be configured so the resulting optical out-of-band channels 104 provide the desire level of security.

Depending on the particular application, the process of distributing keys to different peripheral devices or computers using keys transmitted over optical out-of-band channels can be performed during each sign-on or logon. Alternatively, each device (the peripheral device or the computer) can store the key information or key that binds it to a particular computer through different power cycles. More particularly, many wireless devices include non-volatile memory that can survive a power cycle. When the computer or the peripheral device wakes up or logs on, the respective computer or the peripheral device still has the key information or the key.

As another example of the use of the system 103, assume the out-of-band communication system 103 includes a camera having a trusted camera built therein, and a peripheral device such as a mouse that is not trusted. The user could show a picture to the camera in the computer, and the peripheral device could take a picture with a camera in the peripheral. The digitized form of the picture becomes the key in both the computer and the peripheral device. The user generates the key information, randomly, and the two cameras (in the computer and the mouse) look at the picture differently, and deduct the key separately from the picture. A digital signal processor (DSP) can align the digitized pictures in the camera of the computer and the camera of the peripheral device.

While the disclosure describes the out-of-band channel being used to transmit the key information primarily to, and between, peripheral devices, it should be evident that the out-of-band channels can be used to transmit keys between those portions in different computers that include the operating system. As such, each optical out-of-band channel 104, as described herein, can be considered as a connection between any combination of devices, including one or more portions of the computer including the operating system as well as one or more peripheral devices.

FIG. 6 illustrates an example of a suitable computer environment 100 or network 100 that can be configured to include a plurality of computers and key devices that allow for a variety of optical out-of-band channels 104c, 104d, 104e, 104f, 104g, 104h, and 104i as described herein to be formed that can transfer key information. These optical out-of-band channels are illustrative in nature, but not limiting in scope since optical out-of-band channels can be provided between virtually any desired combination of pairs of peripheral devices and/or computers. The computer environment 100 illustrated in FIG. 6 is a general computer environment, which can be used to implement the techniques described herein. The computer environment 100 is only one example of a computer environment and is not intended to suggest any limitation as to the scope of use or functionality of the computer and network architectures. Neither should the computer environment 100 be interpreted as having any dependency relating to any one or combination of components illustrated in the exemplary computer environment 100.

The computer environment 100 includes a general-purpose computing device in the form of a computer 502. The computer 502 can include, for example, one or more stand-alone computers, a networked computer, a mainframe computer, a PDA, a telephone, a microcomputer or microprocessor, a gaming console, or any other computer device that uses a processor in combination with a memory. Each of these computers can form one side of one of the optical out-of-band channels 104c, 104d, 104e, 104f, 104g, 104h, and 104i. The components of computer 502 can include, but are not limited to, one or more processors or processing units 504 (optionally including a cryptographic processor or co-processor), a system memory 506, and a system bus 508 that couples various system components including the processor 504 and the system memory 506.

The system bus 508 represents one or more of any of several types of bus structures, including a memory bus or memory controller, at least one peripheral bus, at least one peripheral device, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by computer 502 and includes both volatile and non-volatile media, and removable and non-removable media.

The system memory 506 includes computer readable media in the form of non-volatile memory such as read only memory (ROM) 512, and/or volatile memory such as random access memory (RAM) 510. A basic input/output system (BIOS) 514, containing the basic routines that help to transfer information between elements within computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 6 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer readable media provide non-volatile storage of computer readable instructions, data structures, program modules, and other data for computer 502. Although the example illustrates a hard disk within the hard disk drive 515, a removable magnetic disk 520, and a non-volatile optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via peripheral devices and/or input devices such as the keyboard 534 such as described relative to FIG. 4, and a pointing device 608 (e.g., a "mouse") such as described relative to FIG. 5. Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB). Any ones of these peripheral devices can form one side of one of the optical out-of-band channels 104c, 104d, 104e, 104f, 104g, 104h, and 104i.

Other peripheral devices include a monitor 542 or other type of display device can also be connected to the system bus 508 via an interface, such as a video adapter 544. In addition to the monitor 542, other output peripheral devices can include components such as speakers (not shown), a PDA, a keyboard, a mouse, and a printer 546, which can be connected to computer 502 via the input/output interfaces 540.

The computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computing device 548 are depicted as a local area network (LAN) 550 and a general wide area network (WAN) 552. Such networking environments are commonplace in offices, enterprise-wide computer networks, intranets, and the Internet. Such LAN and WAN connections can be run in parallel to each optical out-of-band channel 104c, 104d, 104e, 104f, 104g, 104h, or 104i.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computer environment 100, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer. It will be appreciated that the network connections shown and described are exemplary and other means of establishing a communications link between the computers may be used.

Various modules and techniques may be described herein in the general context of computer executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although systems, media, methods, approaches, processes, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. An out-of-band communication system comprising:
   an encrypted data path that is configured to convey encrypted data between an operating system and a peripheral device;
   an optical out-of-band channel that is physically distinct from the encrypted data path, wherein the optical out-of-band channel generates a pseudo-random symmetric key and transmits to a peripheral device, wherein the peripheral device may be wire-based or wireless;
   wherein the pseudo-random symmetric key is stored by two parties;
   a computing device having the operating system and the peripheral device store the pseudo-random symmetric key, wherein the pseudo-random symmetric key establishes secure communication with communication devices;
   the optical out-of-band channel extends between an optical transmitter and an optical receiver, the optical out-of-band channel is further configured to transmit the pseudo-random symmetric key information from the optical transmitter to the optical receiver or from the optical receiver to the optical transmitter
   a mounting portion optically obstructs light containing key information that is transmitted to locations other than the optical receiver, wherein this permits key information transfer from a distinct optical transmitter to the optical receiver,
   the optical receiver is a transducer that converts light into an electrically readable signal;
   the optical transmitter has a light source of bandwidth that is detectable by the optical receiver; and
   data transferred in a transmission protocol.

2. The out-of-band communication system of claim 1, wherein the encrypted data path conveys encrypted data over an optical path.

3. The out-of-band communication system of claim 1, wherein the encrypted data path conveys encrypted data over a non-optical path.

4. The out-of-band communication system of claim 1, wherein the optical transmitter is included in a peripheral device.

5. The out-of-band communication system of claim 1, wherein the optical receiver is included in a peripheral device.

6. The out-of-band communication system of claim 1, wherein the optical transmitter is included in a computer.

7. The out-of-band communication system of claim 1, wherein the optical receiver in included in a computer.

8. The out-of-band communication system of claim 1, further comprising a peripheral device, wherein the peripheral device includes the optical transmitter and the optical receiver.

9. The out-of-band communication system of claim 8, wherein the peripheral device acts to convey key information from one peripheral device or computer to another peripheral device or computer.

10. The out-of-band communication system of claim 1, further comprising a peripheral device including the optical receiver, wherein the peripheral device is configured to maintain the key information.

11. The out-of-band communication system of claim 1, wherein the optical out-of-band channel includes a host device and a peripheral device.

12. The out-of-band communication system of claim 11, wherein the peripheral device acts to convey the key information from the host device to another device.

13. The out-of-band communication system of claim 11, further comprising a second out-of-band channel extending from the peripheral device to another device.

14. The out-of-band communication system of claim 1, wherein the encrypted data over the encrypted data path is encrypted based on a key derived from the key information transmitted over the optical out-of-band channel.

15. The out-of-band communication system of claim 1, wherein the optical transmitter includes a light emitting diode (LED).

16. The out-of-band communication system of claim 1, wherein the optical transmitter includes an infrared transmitter.

17. An out-of-band communication system comprising:
   an encrypted data path that is configured to convey encrypted data;
   a first optical out-of-band channel that is physically distinct from the encrypted data path, wherein the first optical out-of-band channel generates a pseudo-random symmetric key and transmits to a peripheral device, wherein the peripheral device may be wire-based or wireless;
   a computing device having an operating system and the peripheral device store the pseudo-random symmetric key, wherein the pseudo-random symmetric key establishes secure communication with communication devices;
   the first optical out-of-band channel extends between a first optical transmitter and a first optical receiver, wherein the first optical receiver is capable of converting light into an electrically readable signal;
   the first optical out-of-band channel is further configured to transmit the key information from the first optical transmitter to the first optical receiver or from the first optical receiver to the first optical transmitter;
   a second optical out-of-band channel that is physically distinct from the encrypted data path, wherein the second optical out-of-band channel extends between a second optical transmitter and a second optical receiver, wherein the second optical out-of-band channel is further configured to transmit the key information from the second optical transmitter to the second optical receiver or from the second optical receiver to the second optical transmitter;
   the peripheral device including the first optical receiver and the second optical transmitter;
   a mounting portion optically obstructs light containing key information that is transmitted to locations other than the optical receiver, wherein this permits key information transfer from a distinct optical transmitter to the optical receiver;
   the optical transmitter has a light source of bandwidth that is detectable by the optical receiver; and
   data transferred in a transmission protocol.

18. The out-of-band communication system of claim 17, wherein the first optical transmitter includes a computer display.

19. The out-of-band communication system of claim 17, wherein the peripheral device is used to convey the key information from the first optical transmitter to the second optical receiver.

* * * * *